United States Patent Office 3,091,650
Patented May 28, 1963

3,091,650
TELOMERIZATION OF UNSATURATED HYDROCARBONS WITH ALIPHATIC-SUBSTITUTED AROMATIC HYDROCARBONS AND TELOMERIC PRODUCTS OBTAINED THEREBY
Donald D. Emrick, Shaker Heights, and David L. Beals, Newbury, Ohio, assignors to The Standard Oil Company, Cleveland, Ohio, a corporation of Ohio
No Drawing. Filed Dec. 7, 1959, Ser. No. 857,492
16 Claims. (Cl. 260—668)

This invention relates to a process for the telomerization of α-olefins, and particularly higher α-olefins and mixtures of ethylene therewith, using aliphatic-substituted aromatic hydrocarbons containing a labile hydrogen atom, and more particularly to the telomerization of such olefins with aliphatic-substituted aromatic hydrocarbons in the presence of a free radical initiator, and to the telomers thereby obtained, which have properties adapting them for use as synthetic lubricants and mineral lubricating oil blending agents.

Large amounts of ethylene and propylene are available either from petroleum refinery gases, or are made readily on cracking hydrocarbons. Also, large amounts of aromatic fractions are not readily usable. Any process for utilizing these materials would be commercially attractive.

Olefins undergo a reaction known as telomerization, which has been described in numerous patents and publications. This involves the reaction of the olefin, called a taxogen, with a fragment of another molecule, known as a telogen, and the product of this reaction is called a telomer. The reaction can be defined by the following equation:

(I)
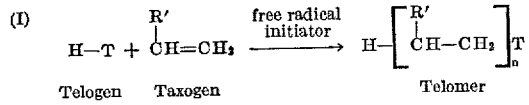

| Telogen | Taxogen | | Telomer |

R′ is hydrogen or an alkyl, aryl, mixed alkyl aryl, mixed aryl alkyl, or cycloalkyl radical.

Telomers are different from copolymers and/or interpolymers. Copolymers and/or interpolymers contain a number of each of two or more different monomer units in the main polymer chain, whereas the fragments of another molecule (the telogen) in telomers appear as units at the terminal of the main polymer chain. Telomerization differs from simple free radical addition to the double bond of an olefin in that more than one molecule of the olefin appears in the product. The telomerization reaction proceeds in the presence of a free radical initiator which removes an active hydrogen from the telogen. The resulting radical initiates the telomerization by adding to the double bond of the olefin.

U.S. Patent No. 2,432,381 to Donald D. Coffman and John R. Roland, dated December 9, 1947, describes the preparation of solid waxes by the alkylation of short chain alkyl-substituted aromatic hydrocarbons by heating them with ethylene in the presence of a catalytic quantity of a ketaldone derivative containing the group >C=N— as the alkylation catalyst. Quite severe reaction conditions are required, the temperatures ranging from 200 to 300° C. and the pressures ranging from 400 to 1500 atmospheres. The waxy solid products have a low molecular weight, of from about 200 to about 900, and are used as additives for lubricating oils and greases, as raw materials for conversion to other useful products, and as solid lubricants. The ketaldone alkylation catalyst is indispensable to the reaction.

In accordance with the process of the instant invention, α-olefin taxogens such as ethylene, higher α-olefins and mixtures of ethylene and higher α-olefins are telomerized with an aliphatic-substituted aromatic hydrocarbon, such as may be present in petroleum, and containing at least one labile hydrogen in the aliphatic radical, in the presence of an organic peroxide serving as a free radical initiator for the telomerization. Both the aliphatic and aromatic radicals are hydrocarbon radicals. The reaction proceeds with ease at temperatures within the range from about 40 to 175° C., and at moderate pressures, depending upon the boiling point of the olefin, but not over 5000 p.s.i.g. Ethylene requires the highest pressure; with other olefins, the pressure may be considerably lower, as low as 10 p.s.i.g.

The products obtained from ethylene alone or mixtures thereof with small amounts of a higher α-olefin, generally not in excess of about 10%, are waxes of rather high molecular weight, usually in excess of 1000. Higher α-olefins alone and mixtures thereof with ethylene when the amount of ethylene is not too great, such as under about 90%, give liquids or oils useful as synthetic lubricants or as additives for petroleum-derived lubricating oils, whose solubility in lubricating oils ranges from completely miscible to compatible in substantial proportions.

Chemically, the product of the invention is a telomer containing mixed aliphatic aromatic hydrocarbon units attached through the aliphatic radical to the polymeric α-olefin-derived hydrocarbon unit. The waxes are similar in many respects to polyethylene or polypropylene, and the liquids or oils are very similar in properties to an aromatics-containing petroleum-derived lubricating oil fraction. In addition to being useful as a lubricant, the liquids and oils also may be useful as a plasticizer. Both waxes and liquids can be used as chemical intermediates utilizing the reactivity of the aromatic ring, say, for the manufacture of the synthetic detergents, by sulfonation of the aromatic rings present in accordance with known procedures.

The telogen is an aliphatic-substituted aromatic compound, the aliphatic group of which has at least one labile hydrogen. Frequently, a hydrogen on the carbon atom attached to the aromatic ring is labile, whether the carbon is primary, secondary, or tertiary. Secondary or tertiary hydrogens further out on the alkyl group also are labile but usually to a lesser extent. At least one carbon atom in this aliphatic radical is attached to an aromatic ring, which may be a single ring, such as benzene, or a condensed ring such as naphthalene. The aliphatic radical can be alkyl, or an alkylene unit forming a second ring with the aromatic radical, such as in tetrahydronaphthalene, or serving as a linking unit between two or more rings, at least one of which is aromatic, such as in fluorene.

The aliphatic substituent on the aromatic nucleus of the hydrocarbon may be a monovalent, divalent, or trivalent aliphatic hydrocarbon radical having from one to twenty-four carbon atoms. The aromatic nucleus may be mono- or polycyclic. Generally speaking, the total number of carbon atoms in the telogen does not exceed about thirty.

The aliphatic substituent, for example, can be an alkyl radical, or an alkylene radical condensed with the aromatic ring to form a saturated cycloaliphatic ring therewith, or attached as a bridging radical between two aromatic nuclei, or between one aromatic and one saturated cycloaliphatic ring, for example, cyclohexyl, cyclopentyl, cycloheptyl, tetracyclyl, cyclopropyl, and cyclobutyl.

It will be apparent from this that the aliphatic substituent can, for example, include any of the following: ethyl, propyl, isopropyl, isobutyl, secondary butyl, 2-ethylhexyl, isoctyl, isononyl, isoamyl, isohexyl, 3-methyl-heptyl, isodecyl, methylene —$CH_2$—, ethylene, 1,2-propylene, 1,3-propylene, 1,4-butylene, 1,3-butylene, 1,4-amylene, 1,5-amylene, 2,5-hexylene, 3,6-hexylene, and methine≡CH (as in triphenyl methane).

The aromatic nucleus can be phenyl, naphthyl, anthracyl, and phenanthracyl, for example.

Typical telogens coming within the class defined are isopropyl benzene (cumene), ethyl benzene, toluene, isohexyl benzene, isobutyl benzene, secondary butyl benzene, α- and β-isopropyl naphthalene, α- and β-isobutyl naphthalene, α- and β-2-ethylhexyl naphthalene, α- and β-methyl naphthalene, dibenzyl, dinaphthyl methane, diphenylmethane, triphenylmethane, fluorene, tetrahydronaphthalene, isopropylanthracene, isopropyl phenanthrene, isobutyl tetracycline, isopropyl ethyl benzene, isopropyl toluene, isopropyl xylene, 1,1-diphenyl ethane, 1,1,3-triphenyl propane, tetralin, α-methyl tetralin, diisopropyl benzene, and diisobutyl benzene.

Mixtures of telogens can frequently be used to advantage. Solvesso 150, a commercial mixture of ethyl benzene and xylenes, is typical of these, as also are aromatic petroleum fractions.

Of particular interest are aromatic hydrocarbons and mixtures thereof as occurring in fractions derived from petroleum, such as intermediate distallate and other solvent extracts obtained in solvent refining of lubricating oil, catalytic reformate bottoms cut, intermediate distillate extract feed, the aromatic product from intermediate distillate extraction, etc. These are largely waste products, and can be reclaimed by the invention to a useful product, at great economic advantage.

The taxogen is an unsaturated hydrocarbon having the general formula:

(II) $\quad R'CH=CH_2$

R' is hydrogen or an aliphatic, aromatic or cycloaliphatic radical having from one to sixteen carbon atoms. These are referred to for convenience herein as α-olefins.

Typical R' radicals are phenyl, methyl, ethyl, isobutyl, n-hexyl, n-amyl, n-butyl, n-propyl, isopropyl, cyclohexyl, cyclopentyl, benzyl, tolyl, xylyl, phenethyl, ethyl phenyl, n-decyl, n-dodecyl, n-tetradecyl, and methyl cyclohexyl.

These telogens are believed to react with the α-olefin taxogen according to the following equation, in which isopropyl benzene is used as exemplary:

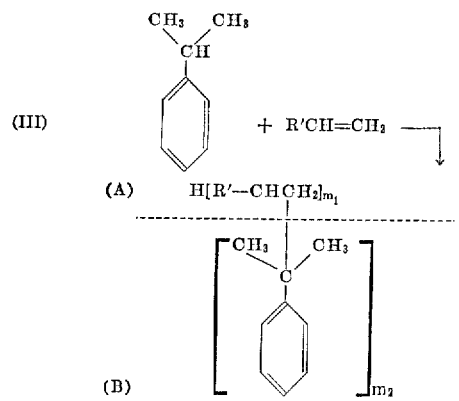

In the above equation, R' is as in (II) above, $m_1$ is the number of moles of the olefin in the polyolefin hydrocarbon unit A, and $m_2$ is the number of moles of the aromatic hydrocarbon B in the telomer molecule.

The above reaction mechanism has been tentatively confirmed by infrared analysis of the telomeric product. When the aliphatic aromatic hydrocarbon contains two or more hydrocarbon-reactive sites, the telomerization may occur at any or all of such sites, depending upon the reaction conditions and the amount and kind of olefin and free radical initiator available for the telomerization.

The telomers obtained using relatively high pressures of ethylene, either alone or in amounts of more than 90% in mixtures with other α-olefins, contain as the principal product large quantities of high molecular weight (above about 1000) high melting solid materials which are waxy or resinous in nature.

The taxogen used to produce an oil is an α-olefin higher than ethylene or a mixture of ethylene with higher α-olefins containing not over 90% ethylene, such as butene-1, pentene-1, 4-methyl pentene-1, 3-methyl hexene-1, hexene-1, heptene-1, octene-1, decene-1, styrene and 8-p-menthene. α-Olefins higher than ethylene in molecular weight can be used alone, but react more slowly and produce lower conversions and yields than mixtures thereof with ethylene. The larger the amount of branching in such olefins, the less the reactivity, also. These factors contribute to the formation of an oil.

In each instance, the inclusion of even a small amount of higher olefin modifies the nature of the reaction product by lowering the melting or pour point, and the larger the proportion of higher olefin, the greater this effect is. Thus, by appropriate adjustment of the proportions of a mixture of ethylene and higher α-olefin, and the particular higher α-olefin, it is possible to prepare a wide variety of products.

Telomers obtained from ethylene with only a small proportion of a higher olefin are generally miscible with solvent-extracted neutral oil stocks at all levels of concentration. The chain modification caused by the incorporation of the higher α-olefin is such as to keep the pour point low enough for practical use as a lubricant, and prevent the production of a solid or waxy product.

The reaction requires a free radical initiator, and this substance can be any of those organic peroxides well known to those skilled in the art as useful in the telomerization of ethylene. It should be sufficiently active to decompose freely into free radicals under the reaction conditions which can be employed.

An initiator is required which is capable of depriving the telogen of its labile or active hydrogen, and starting the series of reactions which leads to the telomer. Free radicals are required which are active at 175° C. or below. Furthermore, the telomerization reaction chain is easily interrupted and the reaction halted by conventional free radical inhibitors, and the reactants should be relatively free from such inhibitors.

Peroxide initiators which can be used include diacyl peroxides such as diacetyl peroxide, dipropionyl peroxide, dibutyryl peroxide, dilauroyl peroxide, acetyl benzoyl peroxide, and dibenzoyl peroxide; dialkyl peroxides such as di-tert-butyl peroxide, dihexyl peroxide, di-isopropyl peroxide, di-isobutyl peroxide, di-2-ethylhexyl peroxide, di-n-butyl peroxide, and diethyl peroxide; terpene peroxides, dicycloaliphatic peroxides such as dicyclohexyl peroxide; and combinations of perhalogen compounds such as hexachloroethane with dialkyl peroxides.

Di-tert-butyl peroxide is a preferred free radical initiator for use in this invention.

The stability of free radical initiators is customarily evaluated in terms of half-life at a stated temperature, and the following table compares this for several commercially available organic peroxide free radical initiators:

TABLE I

| Compound | Temp. (° C.) | Half-Life (Hours) | No Moles of Radical Produced Per Pound |
|---|---|---|---|
| 1. Lauroyl Peroxide | 50 | 54.2 | 2.27 |
| | 70 | 3.4 | |
| | 85 | 0.5 | |
| 2. Dicumyl Peroxide | 115 | 12.4 | 3.34 |
| | 130 | 1.8 | |
| | 145 | 0.38 | |
| 3. Di-t-butyl Peroxide | 100 | 218 | 6.20 |
| | 115 | 34 | |
| | 130 | 6.4 | |
| | 145 | 1.4 | |
| | 160 | 0.24 | |
| 4. Benzoyl Peroxide | 70 | 13.0 | 3.74 |
| | 85 | 2.15 | |
| | 100 | 0.40 | |
| 5. 2,4-Dichlorobenzoyl Peroxide | 50 | 17.8 | 2.38 |
| | 70 | 1.41 | |
| | 85 | 0.25 | |

In general, the half-life of the free radical initiator employed at the reaction temperature should be within the range from about 0.25 to about 10 hours, since such initiators have been found to give the best results. By suitable modification of the reaction conditions, however, it is possible to employ free radical initiators whose half-life is outside of this range.

The reaction conditions can be widely varied. The reaction temperature is 175° C. or below, and is established by the temperature at which the free radical initiator decomposes to give a rapid liberation of a substantial amount of free radicals within the above-stated range for half-life. For di-tertiary-butyl peroxide, for example, the table shows that the preferred reaction temperatures are within the range from 125 to 160° C. Lauroyl peroxide, on the other hand, can be used at temperatures of from 65 to 90° C. At reaction temperatures below this, because of the slower evolution of free radicals, the reaction time tends to be quite long. Higher temperatures may be wasteful, since the free radical initiator may be decomposed at a higher rate than can be utilized in the telomerization, so that the free radicals will be lost. In general, for heat-decomposable free radical initiators, reaction temperatures within the range from 40 to 175° C. are useful.

If the boiling point of the α-olefin is low, it is necessary to operate under pressure. The pressure is not critical, but depends upon that required to contain the reactants in the reaction used, which in turn is a function of the initiator, the boiling point of the α-olefin, and its concentration, and the reaction temperature. When the reaction temperature employed is within the range from about 40 to about 175° C. preferably from about 120 to about 160° C., with di-tertiary-butyl peroxide as the initiator, and ethylene or mixtures thereof is used, the pressure preferably is within the range from about 500 to about 3000 p.s.i.g. Lower pressures can be adequate when ethylene is absent, depending on the boiling point of the α-olefin used. α-Olefins of molecular weight somewhat higher than ethylene and boiling points in the lower part of the reaction temperature range require only relatively low pressures, and high molecular weight α-olefins can be reacted at pressures as low as 10 p.s.i.g.

If the free radical initiator is decomposable by radiation, such as by ultraviolet rays, such radiation can be used, and it may then be unnecessary to heat the reaction mixture above room temperature.

If the reactants are liquids at the reaction temperature, no solvent is necessary unless dilution is desired to maintain control of the reaction rate. A solvent may be desirable when the telogen is a solid in order to increase the reaction rate.

The solvent should be inert under the telomerization reaction conditions. Suitable solvents include benzene, cyclohexane, n-octane, and iso-octane. Preferably, the reaction mixture is agitated.

The reaction initially is noticeably exothermic, and requires careful control to prevent the temperature from rising so high that free radical initiator decomposition becomes too rapid. As the initiator is used up, less heat is liberated, and eventually it becomes necessary to heat the reaction mixture in order to bring the reaction to completion.

The reaction time will depend upon the initiator and the reactants, the concentrations thereof, and the reaction temperature. It is usually convenient to employ reaction conditions such that the reaction can be complete in less than ten hours, but of course, this is a matter of choice, and reaction times as long as thirteen to fifty hours may not be out of line, depending upon the need.

A higher olefin concentration for a given olefin will yield a higher molecular weight product than will a lower olefin concentration. A greater concentration of higher α-olefin (as contrasted to ethylene) in mixtures with ethylene also tends to produce lower molecular weight products. A lower temperature has the same effect. At any given pressure level, the average molecular weight of the product may be increased by operating at the minimum temperature permitted by the decomposition temperature of the free radical initiator, so as to obtain a slow evolution of free radicals, but such reactions will require a long time to complete; the use of ethylene-rich mixtures tends to produce products of higher molecular weight than ethylene-lean mixtures. The same effect may be obtainable by incorporating an inert diluent which is a good solvent for the gaseous α-olefin.

The reaction is easily carried out in conventional pressure equipment. The reactants are introduced in any convenient order, and the equipment brought to the reaction conditions desired.

The ingredients may be brought together in any order but preferably, the aliphatic aromatic hydrocarbon, the α-olefin, and the solvent, if one is employed, are first mixed together and the free radical initiator is then added incrementally. If the olefin is a gas such as ethylene and propylene, the reaction vessel may be run at a constant olefin gas pressure throughout the reaction during the addition of the free radical initiator. In this manner, greater telogen conversions may be obtained together with the production of telomers of a more uniform average molecular weight distribution.

Usually, successful reactions are noticeably exothermic in the early stages of reaction and cooling is often necessary to control the reaction, especially during this early phase of the reaction. The course of reaction is often followed from a drop in olefin pressure; if an initial pressure of 850 p.s.i.g. at 20° C. of ethylene-rich olefin is used, the pressure during a successful reaction will frequently be decreased to 25 to 50% of its initial value during the course of the reaction. The final reaction product is subjected to distillation. If a lubricating oil is desired, the higher boiling fraction or pot residue can be treated with fuller's earth or preferably bentonite clay in order to remove the small quantity of wax usually present.

A continuous reaction is of particular interest in a commercial process. This is readily effected by suitable equipment which permits continuous blending of the aliphatic aromatic hydrocarbon with the α-olefin and free radical initiator, holding them in a pressurized reaction chamber in which they have a dwell time equivalent to that required to complete the reaction, and then drawing them off to a working-up chamber where they are fractionated.

Telomer products are obtainable having a wide range of molecular weights which vary according to the reactants, reaction conditions and concentration of reactants. The molecular weight can range from as low as 190 up to about 35,000. The low molecular weight materials derived from higher α-olefins or ethylene-lean mixtures of such olefins, ranging from about 190 to about 1100 molecular weight, are oils. The high molecular weight materials, from such olefins, ranging above about 1100, are viscous liquids which range from barely flowable to gel-like in character and tend to be waxy. All such liquids conform to the shape of the containing vessel. If derived from ethylene-rich mixtures of olefins, the high molecular weight telomer fractions may be quite hard, however.

The following examples in the opinion of the inventors represent the best embodiments of their invention.

Example 1

Into a one gallon capacity autoclave which had previously been evacuated of air was placed 905 g. of cumene, 59 g. of di-tertiary-butyl peroxide and about 365 g. of liquefied propylene, under nitrogen to produce a total pressure of nitrogen plus propylene of 200 p.s.i.g. at 35° F. Sufficient ethylene gas was then added to produce a total pressure of 760 p.s.i.g. at 35° F. The reactants were then slowly heated to 282° F., with stirring, and maintained at 276–282° F. for eighteen hours. The excess gaseous olefins were vented off, and 1221 g. of crude telomer was obtained. The crude product was fractionally distilled and the following fractions were collected, at the temperature ranges stated:

|  | G. |
|---|---|
| (a) To 154° C. at 750 mm. (mostly recovered telogen) | 749 |
| (b) From 154 to 159° C. at 750 mm. | 87 |
| (c) From 159° C. to 750 mm. to 103° C. at 0.9 mm. | 60 |
| (d) From 103° C. at 0.9 mm. to 125° C. at 0.9 mm. | 16 |
| (e) From 125° C. at 0.9 mm. to 142° C. at 0.94 mm. | 18 |
| (f) From 142° C. at 0.94 mm. to 188° C. at 0.95 mm. | 23 |
| (g) From 188° C. at 0.95 mm. to 210° C. at 0.5 mm. | 20 |
| (h) Residue (above 210° C. at 5 mm.) | 246 |

The properties of the higher molecular weight residual fraction (h) are given in Table II.

Example 2

Example 1 was repeated, using the same reaction conditions. 1199 g. of crude product was produced, and used as set forth in Example 7. The properties of the product are given in Table II.

Example 3

Example 1 was repeated, using the same reaction conditions. 1285 g. of crude product was produced, and used as set forth in Example 7.

Examples 4 to 6

Three other runs were made with the same results, 1100–1280 g. of product being produced per run. These were used as set forth in Example 7.

Example 7

7230 g. of crude telomer obtained by combining the products of the preceding six runs was fractionally distilled, producing 4915 g. of recovered cumene and 1110 g. of a thick resinous residue boiling above 200° C. at 0.23 ml. of mercury, average molecular weight 893, viscosity 1469 SSU at 100° F. of 128.1 SSU at 210° F., Viscosity Index 113. The properties of the residual product are given in Table II. About 40 g. of 2,3-dimethyl-2,3-diphenylbutane crystals were also obtained.

Example 8

Seventy-nine grams of mixed diisopropylbenzene (purified of phenolic and hydroperoxide content) and 4.1 g. of di-tertiary-butyl peroxide were placed in a 500 ml. autoclave, then flushed with nitrogen to expel air. Ethylene was added to produce a pressure of 880 p.s.i.g. at 86° F. (2850 p.s.i.g. at 225° F.). The reaction mixture was slowly heated, with stirring, at 278–295° F. for seventeen hours. The crude product weighed about 123 g. Distillation of 65.5 g. crude product yielded about 38 g. of recovered diisopropylbenzene, 25 g. of material boiling at 65–110° C. at 1.6 mm., and 12.2 g. of residue boiling above 110° C. at 1.6 mm.

The telomer oils obtained in accordance with each of the above Examples 1 to 8 were useful as lubricating oils, as hydraulic fluids, and as plasticizers for synthetic polymers. They could also be used as additives for blends with mineral lubricating oils.

TABLE II

| Example | Taxogen | Telogen | Wt. percent of "Bright Stock"[1] in Crude Product | Percent Olefin Converted | Experimental Average Molecular Weight[2] | Viscosity at 100° F., SSU | Viscosity at 210° F., SSU | Viscosity Index |
|---|---|---|---|---|---|---|---|---|
| 1 | Propylene-ethylene mixture. | Cumene | 19 | 49 | 763 | 1,158 | 115 | 117.5 |
| 2 | ...do... | ...do... | 25 | 66 | 941 | 1,630 | 146.3 | 118 |
| 7 | ...do... | Cumene (Combined from Examples 1 to 6). | 15.4 | 37 | 893 | 1,469 | 128.1 | 113 |
| 8 | Ethylene | Diisopropylbenzene. | <21 | 53 | 683 | 560.9 | 11.12 | 82 |

[1] Pot residual dewaxed by bentonite clay treatment at 20° C.
[2] Melting point depression method.

Example 9

Into a mechanically agitated or stirred autoclave of 500 mls. capacity was placed 125 g. of highly aromatic catalytic reformate bottoms (estimated boiling range 300–470° F.) and 8.5 g. of di-tertiary-butyl peroxide. The pressurized vessel was flushed out with nitrogen to remove air and then pressured with ethylene to 1100 p.s.i.g. at 80° F. The reactants were then slowly heated up to 272° F., with stirring, and then stirred at 272–300° F. for an additional fifteen hours. The reaction vessel was cooled and the excess ethylene vented off. The product weighed 151 g. Addition of the product to 300 g. of acetone precipitated 18 g. of wax having an average molecular weight of 1435. Distillation of the acetone-soluble fraction produced 17.0 g. of a waxy fraction boiling above 392° F. at 0.9 mm. of mercury, average molecular weight 1067.

Example 10

Using a 500 ml. capacity autoclave as in Example 9, above, 135 g. of highly aromatic refinery intermediate distillate extract feed and 8.5 g. of di-tertiary-butyl peroxide were flushed with nitrogen and pressured with 890 p.s.i.g. of ethylene at 60° F. The reactants were slowly heated, with stirring, to 296° F. and then maintained at 291–296° F. for an additional eighteen hours. Upon cooling the reaction vessel and venting off excess ethylene, 183 g. of crude product was obtained. This crude product was poured into two times its volume of acetone to precipitate 132 g. of acetone-insoluble wax, average molecular weight 1100.

Example 11

Using a 500 ml. capacity autoclave, 120 g. of mixed diisopropylbenzenes and 10 g. of di-tertiary-butyl peroxide were flushed with nitrogen and then pressured with 900 p.s.i.g. of ethylene at 65° F. The reaction mixture was slowly heated, with stirring, to 285° F. and then maintained at 285-295° F. for an additional sixteen hours. The crude product yielded 25 g. of acetone-insoluble wax, average molecular weight 977, and 24 g. of high boiling fraction, average molecular weight 472, boiling above 12° C. at 0.8 mm. of mercury pressure.

Example 12

Using a 500 ml. capacity autoclave, 121 g. of cumene and 8.5 g. of di-tertiary-butyl peroxide were flushed with nitrogen and pressured with 950 p.s.i.g. of ethylene at 65° F. The reactants were slowly heated, with stirring, to 277° F. and then maintained at 277-309° F. for an additional six hours. Upon cooling and venting off the excess olefin gas, 159 g. of crude product was obtained. The product yielded 55 g. of acetone-insoluble wax, average molecular weight 1322, about 19 g. of lower telomers (boiling point above cumene) and about 1 g. of 2,3-dimethyl-2,3-diphenylbutane crystals.

Example 13

Example 12 was repeated, substituting pure tetralin for the cumene. 14.5 g. of product was obtained, boiling above 56° C. at 2.8 mm., and having a molecular weight of 375.

Example 14

Example 12 was repeated, substituting of 1-methyl-1,2,3,4-tetrahydronaphthalene for the cumene. 6.5 g. of residual product was obtained, boiling above 72° C., 0.2 mm., and having a molecular weight of 381.

Example 15

Into a mechanically agitated autoclave of 500 ml. capacity was placed 125 g. of highly aromatic catalytic reformate bottoms (boiling range 300-470° F.) and 8.5 g. of di-tertiary-butyl peroxide. The air content in the pressurized vessel was flushed with nitrogen, and the contents then pressured with 1100 p.s.i.g. of mixed ethylene (900 p.s.i.g. partial pressure), propylene (about 45 grams) and nitrogen at 80° F. The reactants were slowly heated up to 272° F. with stirring, and then stirred at 272 to 300° F. for an additional fifteen hours. The reaction vessel was cooled, and the excess ethylene vented off, to produce an oil completely soluble in mineral lubricating oil in all proportions and very similar to a "bright stock" in properties.

Example 16

Using a 500 ml. capacity autoclave, 135 g. of highly aromatic refinery intermediate distillate extract feed (the residue recovered from the furfural portion of furfural-extracted petroleum lubricating oil) and 7.0 g. of di-tertiary-butyl peroxide were flushed with nitrogen. About 45 g. of liquefied propylene was then introduced under nitrogen, to produce a total pressure of 200 p.s.i.g. of nitrogen plus propylene at 35° F., and sufficient ethylene gas then introduced to produce a total pressure of 600 p.s.i.g. at 35° F. (3600 p.s.i.g. at 240° F.). The reactants were slowly heated to 296° F. with stirring, and maintained at 280 to 296° F. for an additional eighteen hours. The excess gaseous olefins were vented off, and 180 g. of crude telomeric oil obtained. The dewaxed product was similar to a "bright stock" in properties.

The telomers of the invention as the general formula shows possess a polyaliphatic hydrocarbon portion and a terminal alphatic aromatic hydrocarbon portion. As a result, they have most attractive properties, both chemical and physical.

The polyaliphatic hydrocarbon portion of the telomer according to its molecular weight and the nature of the olefin used controls the melting properties of the telomer which varies from a solid wax to a viscous oil to a fairly mobile fluid. The aliphatic aromatic unit modifies the polymer considerably, introducing a certain aromatic character thereto, modifying its solubility in petroleum oils and increasing its reactivity.

The telomeric oils of the invention are useful alone or in combination with petroleum-derived fluids such as mineral lubricating oils as lubricants for internal combustion engines, heat transfer fluids, hydraulic fluids, textile lubricants and other applications where high lubricity and petroleum oil solubiilty make them quite attractive. They are useful as plasticizers for synthetic resins with which they are compatible.

The waxy telomers are useful as waxes in the formulation of polishes, carbon paper, crayons, and printing inks. The resinous materials are thermoplastic, and can be used in coating compositions and hot melts. Both waxes and resins can be used in coating compositions for paper and paper containers, e.g., milk cartons.

The oil-soluble liquid telomers and viscous oily telomers can be used as petroleum lubricant blending agents. The viscous telomers from mixtures of higher α-olefins and ethylene tend to resemble "bright stocks" in properties. These liquid telomers may improve the properties of the petroleum lubricating oil with respect to gum deposition and sludge deposition, viscosity and viscosity index.

The oil-soluble telomers can be incorporated in any hydrocarbon lubricating stock, such as a solvent-extracted or solvent-refined oil, i.e., oils treated in accordance with conventional modern methods of solvent-refining lubricating oils. The oil may be a fluid hydrocarbon lubricating base stock having a viscosity at 100° F. of 10 to 500 centistokes, such as is used as the base for SAE Nos. 10 to 50 oils. It may be obtained as a distillate such as from petroleum, or from synthetic materials, and oils produced by cracking, polymerization, dehydrogenation and the like methods are also contemplated.

The solvent-refining process is well known and generally involves a physical separation of impurities from the oil by extraction with a solvent. Usually the solvent selected such as furfural, phenol, sulfur dioxide, etc., dissolves such constituents as aromatic, unsaturated and low viscosity index materials, and these are separated. A clay treatment may follow, but while this is desirable, it is not essential. Where necessary, a separate propane or the like deasphalting treatment may be used in conjunction with the solvent-refining.

The amount of the telomer can be widely varied. If the telomer itself is a lubricant, any proportion can be used, depending upon the proportion desired in the final product. The maximum proportion will usually be determined by the solubility of the telomer in the petroleum oil. Usually, the telomer is completely miscible with the petroleum oil. Beyond the limit of solubility of the telomer in the oil, the telomer oil at a certain proportion may become a solvent for the petroleum oil, so that this solubility limit may not be a limitation.

The aromatic group may be utilized to prepare new sulfonic acids having detergent, wetting and emulsifying properties. This can be done by sulfonation, using familiar reagents such as concentrated sulfuric acid or oleum or chlorosulfonic acid. The following examples are illustrative:

Example 17

One part of the telomer of Example 1 was mixed with 0.9 part of concentrated oleum. The mixture was mechanically stirred with heating at 100 to 110° C. for three hours. The mixture darkened somewhat. At the conclusion of the reaction period it was cooled to room temperature and poured on ice. The resulting solution upon neutralization with sodium carbonate displayed good wetting properties.

The free acid can be obtained in pure condition by dialyzing the solution and evaporating the dialyzate to dryness. The salt can be obtained by neutralizing the solution with the corresponding hydroxide, for example, sodium hydroxide or potassium hydroxide.

*Example 18*

One part of the telomer of Example 1 was dissolved in 5 parts of ethylene dichloride. The mixture was stirred mechanically, and maintained at a temperature of from 10 to 20° C., while 0.5 part of chlorosulfonic acid was added. After five hours reaction time, the mixture was diluted with water. The ethylene dichloride was distilled off, and the remaining solution converted to the sodium salt by addition of sodium hydroxide, following which it was evaporated to dryness. The sodium salt in aqueous solution displayed good wetting properties.

The term "liquid," as used in the claims in defining the product of the process of the invention, is employed in its ordinary meaning to refer to liquids that are readily flowable as well as barely flowable or even gel-like in character. They are distinguished from solids, including soft waxes, in that they are flowable, at normal atmospheric temperatures, and always take the form of the containing vessel, whereas solids, such as soft waxes, do not.

The process of the invention is capable of producing both solids and liquids, and the latter are obtained under the special conditions previously described.

We claim:

1. A liquid olefin telomer having a molecular weight within the range from 190 to about 35,000 and corresponding to the general structure:

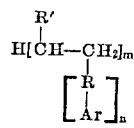

wherein R' is selected from the group consisting of hydrogen, aliphatic, aromatic and cycloaliphatic radicals having from one to sixteen atoms, R represents a bivalent aliphatic substituent having from one to twenty-four carbon atoms, and Ar represents an aromatic nucleus, the total number of carbon atoms of [R—Ar] being up to thirty, the group

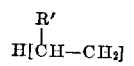

constituting a polyhydrocarbon unit derived from an olefin, the olefin component of which comprises at least 10 percent of an olefin higher than ethylene, and m and n representing the number of groups enclosed by the respective brackets in the molecule of the telomer.

2. A liquid olefin telomer in accordance with claim 1 derived from propylene and ethylene, the propylene comprising at least 10 percent of the total ethylene and propylene.

3. A liquid olefin telomer in accordance with claim 1 wherein the olefin component is ethylene and at least 10 percent of an olefin higher than ethylene.

4. A liquid olefin telomer in accordance with claim 1 wherein the molecular weight is within the range from about 190 to about 1100.

5. A liquid olefin telomer in accordance with claim 1 wherein the molecular weight is within the range from about 1100 to about 35,000.

6. A process for producing a liquid olefin telomer having a molecular weight within the range from 190 to about 35,000 and corresponding to the structure:

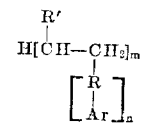

wherein R' is selected from the group consisting of hydrogen, aliphatic, aromatic and cycloaliphatic radicals, having from one to sixteen carbon atoms; R represents a bivalent aliphatic substituent having from one to twenty carbon atoms and Ar represents an aromatic nucleus, the total number of carbons atoms [R—Ar] being up to thirty, which comprises telomerizing a taxogen of the formula [R'CH=CH₂] having from about two to about twelve carbon atoms, at least 10 percent thereof comprising an olefin having from about three to about twelve carbon atoms, with a telogen of the formula [R—AR] in the presence of an organic peroxide free radical initiator capable of initiating the telomerization at a temperature within the range from about 40 to 175° C. under a pressure below about 5000 p.s.i.g., under which conditions an evolution of free radicals from the initiator is obtained.

7. A process in accordance with claim 6 in which the α-olefin is a mixture of ethylene and a second α-olefin, containing at most about 90% ethylene.

8. A process in accordance with claim 6 in which the α-olefin is a mixture of ethylene and a second α-olefin containing at most about 10% ethylene.

9. A process in accordance with claim 6 in which the α-olefin is propylene.

10. A process in accordance with claim 6 in which the α-olefin is a mixture of ethylene and propylene.

11. A process in accordance with claim 6 in which [R—Ar] is cumene.

12. A process in accordance with claim 6 in which [R—Ar] is an aromatic fraction derived from petroleum.

13. A process in accordance with claim 6 in which [R—Ar] is an intermediate distillate.

14. A process in accordance with claim 6 in which [R—Ar] is a catalytic reformate bottoms cut.

15. A process in accordance with claim 6 in which the free radical initiator is a dialkyl peroxide.

16. A process in accordance with claim 15 in which the dialkyl peroxide is di-tertiary-butyl peroxide.

References Cited in the file of this patent

UNITED STATES PATENTS

| | | |
|---|---|---|
| 2,407,181 | Scott | Sept. 3, 1946 |
| 2,522,455 | Lieber | Sept. 12, 1950 |
| 2,660,610 | Erchak | Nov. 24, 1953 |
| 2,748,178 | Pines et al. | May 29, 1956 |
| 2,758,140 | Ipatieff et al. | Aug. 7, 1956 |
| 2,773,915 | Baker et al. | Dec. 11, 1956 |
| 2,786,032 | Hollyday et al. | Mar. 19, 1957 |
| 2,867,673 | Chenicek et al. | Jan. 6, 1959 |

UNITED STATES PATENT OFFICE
CERTIFICATE OF CORRECTION

Patent No. 3,091,650            May 28, 1963

Donald D. Emrick et al.

It is hereby certified that error appears in the above numbered patent requiring correction and that the said Letters Patent should read as corrected below.

Column 3, line 37, for "distallate" read -- distillate --; column 8, line 19, for "25" read -- 15 --; column 9, line 9, for "12° C." read -- 122° C. --; column 10, line 10, for "solubiilty" read -- solubility --; column 12, line 16, for "carbons" read -- carbon --.

Signed and sealed this 14th day of January 1964.

(SEAL)                                              EDWIN L. REYNOLDS
Attest:
ERNEST W. SWIDER Attesting Officer                       Acting Commissioner of Patents